United States Patent [19]

Arai

[11] Patent Number: 4,999,718
[45] Date of Patent: Mar. 12, 1991

[54] IMAGE PROCESSING APPARATUS WITH INTERFERENCE SUPPRESSION

[75] Inventor: Hitoshi Arai, Yokohama, Japan

[73] Assignee: Canon Kabushiki Kaisha, Tokyo, Japan

[21] Appl. No.: 90,238

[22] Filed: Aug. 25, 1987

[30] Foreign Application Priority Data

Aug. 29, 1986 [JP] Japan .................................. 61-201606

[51] Int. Cl.⁵ .............................................. H04N 1/40
[52] U.S. Cl. .................................... 358/455; 358/456; 358/465
[58] Field of Search .............. 358/280, 282, 283, 298, 358/465, 466, 455, 456; 395/22

[56] References Cited

U.S. PATENT DOCUMENTS

| | | |
|---|---|---|
| 4,553,173 | 11/1985 | Kawamura .......................... 358/298 |
| 4,782,398 | 11/1988 | Mita .................................... 358/280 |
| 4,800,442 | 1/1989 | Riseman et al. |
| 4,831,392 | 5/1989 | Dei |
| 4,847,654 | 7/1989 | Honma et al. |
| 4,847,695 | 7/1989 | Arai |

Primary Examiner—James J. Groody
Assistant Examiner—David E. Harvey
Attorney, Agent, or Firm—Fitzpatrick, Cella, Harper & Scinto

[57] ABSTRACT

An image processing apparatus comprises a pulse-width-modulation signal generator for processing an image signal generated by an image signal generator by using a pattern signal to produce a pulse-width modulation signal. The pulse-width modulation signal generator generates first and second pattern signals of different periods, selects one of the pattern signals in accordance with a property of an image to be processed, and inhibits the generation of the non-selected pattern signal.

16 Claims, 4 Drawing Sheets

IMAGE PROCESSING APPARATUS WITH INTERFERENCE SUPPRESSION

BACKGROUND OF THE INVENTION

1 Field of the Invention

The present invention relates to an image processing apparatus for reproducing a high quality of image.

2. Related Background Art

In binarizing a digital image signal to form an image by a laser beam printer, it has been proposed, in order to attain half-tone tonalities, to convert the digital image signal to an analog signal and compare the analog image signal with a reference signal such as a ramp wave signal to produce a pulse-width-modulated binary signal. In such an image processing apparatus, a plurality of ramp waves are generated depending on the types of the digital wave signals and the ramp or triangular waves are selectively used depending on the type of the image signal.

Those methods have been proposed by the assignee of the present invention in U.S. patent applications Ser. No. 765,938 filed on Aug. 15, 1985, Ser. No. 897,053 filed on Aug. 15, 1986, Ser. No. 898,096 filed on Aug. 20, 1986, Ser. No. 900,603 filed on Aug. 26, 1986, Ser. No. 900,998 filed on Aug. 27, 1986. Ser. No. 901,825 filed on Aug. 29, 1986, Ser. No. 919,763 filed on Oct. 16, 1986, Ser. No. 923,026 filed on Oct. 24, 1986, Ser. No. 932,030 filed on Nov. 11, 1986, Ser. No. 010,539 filed on Feb. 3, 1987, Ser. No. 012,541 filed on Feb. 9, 1987, Ser. No. 012,322 filed on Feb. 9, 1987, Ser. No. 013,629 filed on Feb. 11, 1987, and Ser. No. 033,462 filed on Apr. 2, 1987.

However, such a ramp wave signal is affected by other ramp wave signals and can overshoot or undershoot as shown in FIGS. 4A and 4B. As a result, a pulse width of a binarized pattern signal, which is theoretically W as shown in FIG. 5A, is shortened by distortions 60 and 61 of the ramp wave as shown in FIG. 5B.

The distortion of the pulse width of the binarized pattern signal causes reversal of density or poor quality in a critical area when a half-tone image is to be produced. This also causes fatal degradation of image quality, giving rise to such problems as pseudo-outline in a line image.

SUMMARY OF THE INVENTION

It is an object of the present invention to solve the above problems.

It is another object of the present invention to provide an improved image processing apparatus.

It is another object of the present invention to provide an image processing apparatus which reproduces a high quality of image.

It is another object of the present invention to provide an image processing apparatus which reproduces a high quality of image with a simple construction.

It is still another object of the present invention to provid an image processing apparatus which reproduces a high quality of image at a high speed.

It is still another object of the present invention to provide an image processing apparatus which reproduces an image of high tonality and high resolution.

It is yet another object of the present invention to provide an image processing apparatus which attains an optimum pulse width modulation required for an image even if a line image, such as characters, and a half-tone image, such as photograph, are mixedly included in one image.

Other objects, features and advantages of the present invention will be apparent from the following detailed description of the preferred embodiment of the invention, taken in conjunction with; the accompanying drawings and appended claims.

DETAILED DESCRIPTION OF THE PREFERRED EMBODIMENTS

Figure 1:
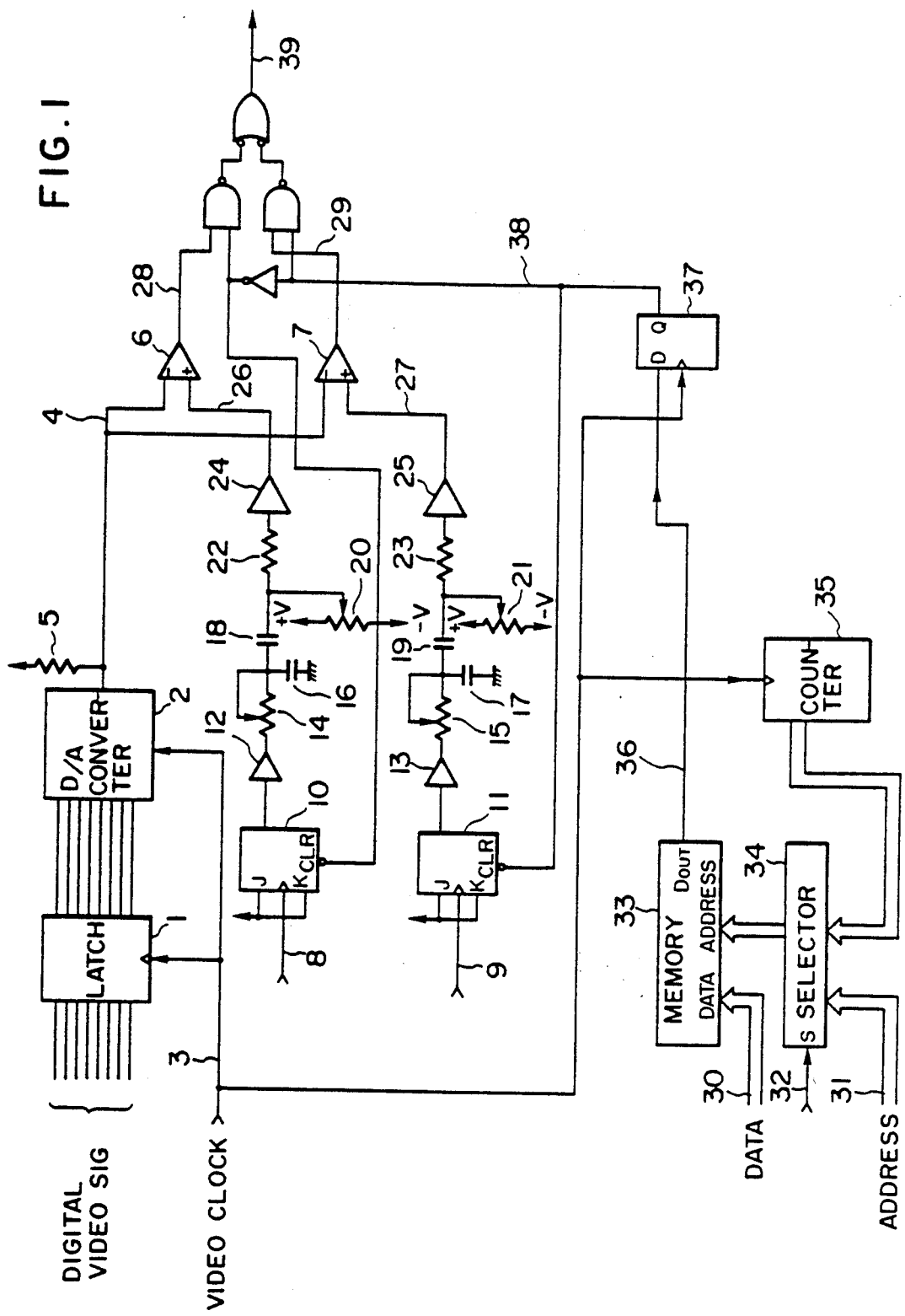
FIG. 1 shows a block diagram of an image processing circuit of an image processing apparatus in accordance with one embodiment of the present invention.

FIG. 1 shows a block diagram of an image processing circuit of an image processing apparatus in one embodiment of the present invention.

An 8-bit video signal applied in synchronism with a video clock 3 is latched in a latch 1 by the video clock 3. Numeral 2 denotes a D/A converter which converts the digital image signal from the latch 1 to an analog video signal 4 in synchronism with the video clock 3. The output of the D/A converter 2 is converted to a voltage level by a resistor 5 and applied to first input terminals of comparators 6 and 7, respectively.

Two-channel ramp wave generation clock signals 8 and 9 synchronized with the video clock 3 are frequency-divided by a factor of two by J/K flip-flops 10 and 11, respectively, to produce clock signals having a duty factor of 50%. The clock signal 9 serves as a pattern signal for a line image document. In order to attain high resolution, the frequency of the clock signal is selected to be two times as high as the frequency of the video clock 3 so that a ramp wave is generated for each pixel. On the other hand, the clock signal 8 serves as a pattern signal for a half-tone image. The frequency of the clock signal 8 is selected to be one third of the frequency of the clock signal 9 in order to enhance the tonality.

The clock signals having the duty factor of 50%, produced by the frequency division by the J/K flip-flops 10 and 11, are supplied to buffers 12 and 13 and then are shaped into ramp waves by integration circuits comprising variable resistors (or potentiometers) 14 and 15 and capacitors 16 and 17, respectively. DC components are blocked by capacitors 18 and 19, biases of the ramp waves are adjusted by the variable resistors 20 and 21, and the ramp waves are level-adjusted by protection resistors 22 and 23 and buffer amplifiers 24 and 25 and finally outputted as ramp waves 26 and 27. The ramp waves 26 and 27 are applied to other input terminals of the comparators 6 and 7 for comparison with the analog video signal 4. The outputs of the comparators 6 and 7 serve as two-channel pulse-width modulation signals 28 and 29.

Figure 2:
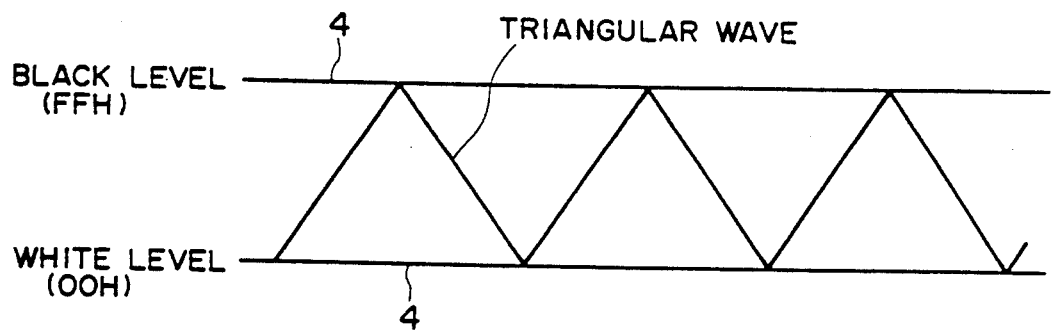
FIG. 2 shows a theoretical level relationship between an analog video signal and a ramp wave.

FIG. 2 shows theoretical levels of the analog video signal 4 and the ramp wave.

In order to attain a high tonality, it is advisable that the level of the ramp wave is between a white level of the analog video signal 4 (input data of the D/A converter 2 is "0") and a black level (input data of the D/A converter is "FFH", where H represents that the preceding digits denote a hexadecimal number). In order to meet the above requirement, the amplitudes are adjusted by the variable resistors 14 and 15 of the ramp wave generator of FIG. 1, and the biases are adjusted by the variable resistors 20 and 21.

Figure 3:
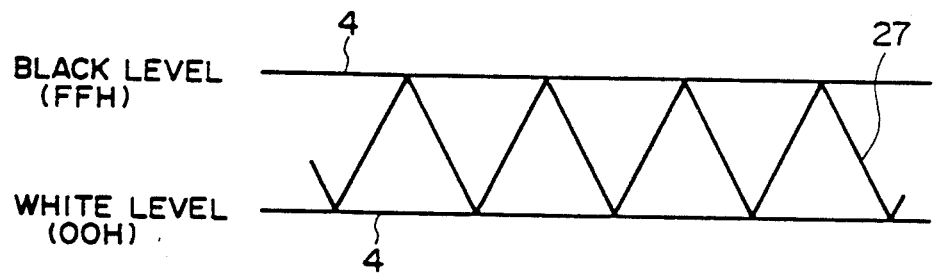
FIGS. 3A and 3B show a relationship between the ramp wave and the analog video signal in the embodiment of FIG. 1.
Figure 3:
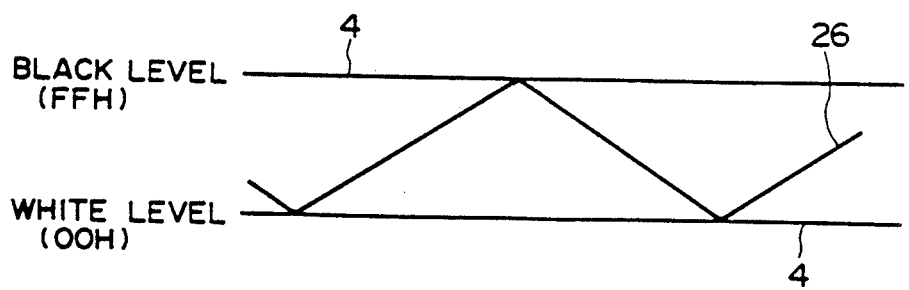
Figure 4:
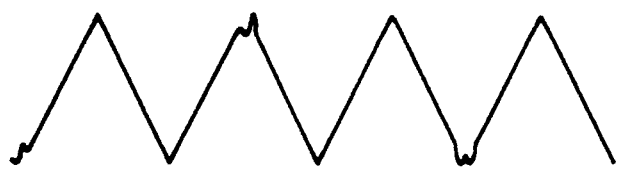
FIGS. 4A and 4B illustrates interference of a ramp wave in a prior art apparatus.
Figure 4:
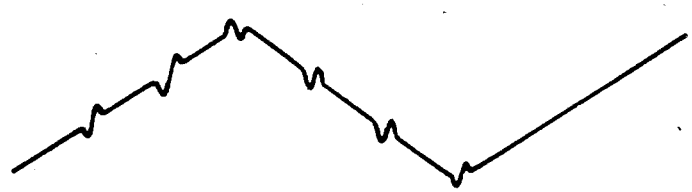
Figure 5:
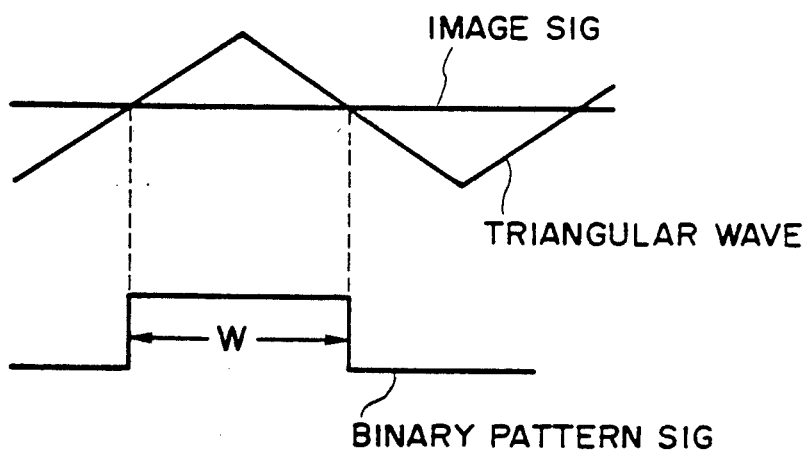
FIG. 5A shows a theoretical relationship between a ramp wave signal and a pulse modulation signal.
FIG. 5B illustrates an affect on the pulse width modulation signal of interference in the ramp wave.
Figure 5:
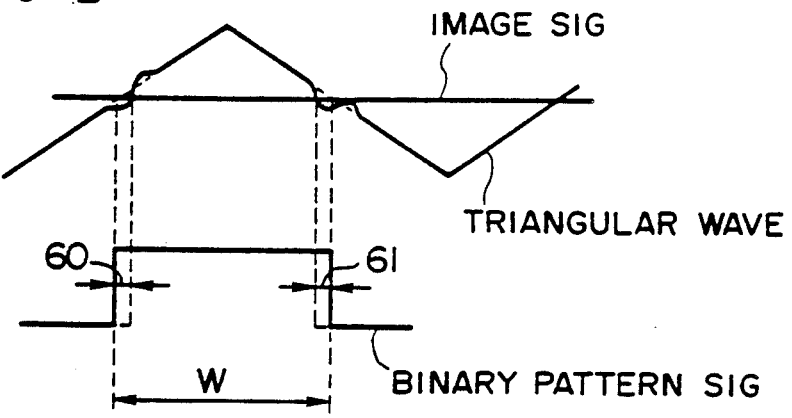

FIG. 3A shows a relationship between the ramp wave 27 for the line image such as characters and the analog image signal 4, and FIG. 3B shows a relationship between the ramp wave 26 for the half-tone image such as a photograph and the analog image signal 4. The ramp waves 26 and 27 and the analog image signal 4 are in the theoretical level relation.

Turning back to FIG. 1, coordinate information in the main scan direction and the sub-scan direction is inputted by a coordinate input device such as a digitizer (not shown), and a non-image area is written into an (n×1) - bit memory 33 by an address signal 31 through a selector 34 and a data signal 30. When a data select signal 32 is "H" (high), the address signal 31 serves as an address signal for the memory 33. Data "0" is written into the memory 33 for an image area (half-tone image) and data "1" is written for an area requiring resolution (non-image area).

After writing into the memory 33, the select signal 32 is changed to "L" (low) so that an output of a counter 35 which counts the video clock 3 serves as the address signal for the memory 33. Thus, 1-bit area data 36 indicating the image area is outputted in synchronism with the input of the digital video signal. The data 36 is applied to a D type flip-flop 37 and latched by the video clock 3.

For the line image which requires resolution, the area signal 38 is "1" and the binarized signal 29 produced by the ramp wave 27 is selected and outputted as a pulse-width modulation signal 39. On the other hand, when the area signal 38 is "0", the binarized signal 28 produced by the ramp wave 26 is selected and outputted. In this manner, the optimum pulse-width modulation signal 39 is selected in accordance with the image (characteristic or property of the image).

Since the area signal 38 is applied to the clear terminal of the J/K flip-flops 10 and 11 which frequency-divide the clock signals 8 and 9, when the ramp wave output of one of the comparators 6 and 7 is selected, the ramp wave output of the other comparator is inhibited. By inhibiting the output of the non-selected ramp wave, interference between the patterns is eliminated and the distortion and overshoot of the ramp wave are suppressed.

In accordance with the present embodiment, the pattern selection signal is used in accordance with the half-tone area or line image area on one document to inhibit the output of the non-selected pattern so that a noise component due to mutual interference is eliminated. Thus, a pulse-width modulation signal which is in linear relation with the image signal is produced, and high quality of images are reproduced for both the half-tone image and line image.

When the circuit shown in FIG. 1 is applied to a laser beam printer, the input image signal and ramp wave may be generated in synchronism with a BD (beam detection) signal (which indicates a horizontal scan position of a laser beam). As a result, the ramp wave can be generated for each main scan line at an exact timing, a desired screen may be produced in the reproduced image, and a high quality of image is reproduced.

In the present embodiment, two ramp waves are prepared and selectively used. More ramp waves may be prepared and selectively used in accordance with the image property. Also, in the present embodiment, the ramp waves shown in FIGS. 3A and 3B are used as the pattern signals, although other pattern signals may be used.

Figure 6:
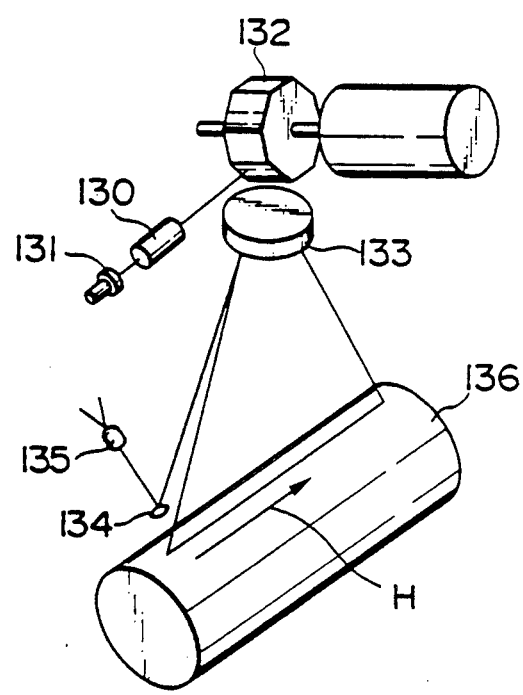
FIG. 6 shows a perspective view of a scanning optical system of a laser beam printer to which the present invention is applicable.

FIG. 6 shows a perspective view of a scanning optical system of a laser beam printer (raster scan printer) to which the present invention is applicable. The scan system includes a semiconductor laser which emits a laser beam modulated by the pulse width modulation signal described above. A light beam modulated by a semiconductor layer 131 is collimated by a collimater lens 130 and then deflected by a rotating polygon mirror (application means) 132 having a plurality of reflection surfaces. The deflected light beam is focused onto a photo-conductor drum 136 by an imaging lens 133 called an fθ lens, and beam-scans it. In the beam scan, an edge of one-line scan of the light beam is reflected by a mirror 134 and it is directed to a beam detector 135. A beam detection (BD) signal from the beam detector 135 is used as the horizontal synchronization signal for the horizontal scan H.

The present invention is not limited to the illustrated embodiments but various modifications may be made within the scope of the appended claims.

I claim:

1. An image processing apparatus comprising:
   image signal generation means for generating an image signal; and
   pulse-width-modulation signal generation means for processing the image signal generated by said image signal generation means by using a pattern signal to produce a pulse-width-modulation signal;
   said pulse-width-modulation signal generation means including a first pattern signal generation means and a second pattern signal generation means for respectively generating first and second pattern signal of different periods, selection means for selecting one of said first and second pattern signals, and inhibit means for inhibiting the generation of the pattern signal not selected by said selection means;
   wherein said first and second pattern signals are ramp waves of different periods and the same amplitude.

2. An image processing apparatus comprising:
   image signal generation means for generating an image signal; and
   pulse-width-modulation signal generation means for processing the image signal generated by said image signal generation means by using a pattern signal to produce a pulse-width-modulation signal;
   said pulse-width-modulation signal generation means including a first pattern signal generation means and a second pattern signal generation means for respectively generating first and second pattern signals of different periods, selection means for selecting one of said first and second pattern signals, and inhibit means for inhibiting the generation of the pattern signal not selected by said selection means;

wherein said pulse-width-modulation signal generation means includes compare means for comparing the pattern signal selected by said selection means with said image signal to produce the pulse-width modulation signal.

3. An image processing apparatus according to claim 2 wherein said image signal generation means include D/A conversion means for converting an input digital image signal to an analog image signal, and the analog image signal from said D/A conversion means is applied to said compare means.

4. An image processing apparatus comprising:
image signal generation means for generating an image signal;
a first gradation processing circuit for gradation-processing an image signal generated by said image signal generation means in a first mode to output a first pulse-width-modulation signal;
a second gradation processing circuit for gradation-processing an image signal generated by said image signal generation means in a second mode to output a second pulse-width-modulated signal;
selection means for selecting one of said first and second pulse-width-modulated signals to be output from said respective first and second gradation processing circuits; and
inhibit means for inhibiting generation of a signal to be used for generation of the pulse-width-modulated signal not selected by said selection means.

5. An image processing apparatus according to claim 4, wherein said first and second pattern signal generation circuits include first and second clock signal generation means for generating first and second clock signals of different periods for use in generating said first and second pattern signals, respectively and wherein said selection means selects one of said first and second pattern signals in accordance with a predetermined designation signal, and said inhibit means inhibits the generation of one of said first and second clock signals in accordance with said designation signal.

6. An image processing apparatus according to claim 5 wherein said designation signal designates an area of the image.

7. An image processing apparatus comprising:
image signal generation means for generating an image signal; and
pulse-width-modulation signal generation means for processing the image signal generated by said image signal generation means by using a pattern signal and for producing a pulse-width-modulation signal;
said pulse-width-modulation signal generation means including a first clock signal generation means and a second clock signal generation means for respectively generating first and second clock signals of different periods, first and second pattern signal generation means for generating first and second pattern signals of different periods by using said first and second clock signals, selection means for selecting one of said first and second pattern signals and inhibit means for inhibiting the generation of the clock signal to be used for the generation of the non-selected pattern signal;
wherein said pulse-width-modulation signal generation means includes compare means for comparing the pattern signal selected by said selection means with said image signal to produce the pulse-width-modulation signal.

8. An image processing apparatus according to claim 7, wherein said image signal generation means includes D/A conversion means for converting an input digital image signal to an analog image signal, and the analog image signal from said D/A conversion means is applied to said compare means.

9. An image processing apparatus comprising:
image signal generation means for generating an image signal; and
pulse-width-modulation signal generation means for processing the image signal generated by said image signal generation means by using a pattern signal and for producing a pulse-width-modulation signal;
said pulse-width-modulation signal generation means including a first clock signal generation means and a second clock signal generation means for respectively generating first and second clock signals of different periods, first and second pattern signal generation means for generating first and second pattern signals of different periods by using said first and second clock signals, selection means for selecting one of said first and second pattern signals and inhibit means for inhibiting the generation of the clock signal to be used for the generation of the non-selected pattern signal;
wherein said first and second pattern signals are ramp waves of different periods and the same amplitude.

10. An image processing apparatus according to claim 4, wherein each of said first and second gradation processing circuits comprises a first pattern signal generating circuit for generating a first pattern signal and a second pattern signal generating circuit for generating a second pattern signal a period of which is different from that of said first pattern signal, and said inhibit means inhibits generation of a pattern signal associated with the pulse-width-modulated signal not selected, in association with said selection means.

11. An image processing apparatus according to claim 10, wherein each of said first and second gradation processing circuits includes a first comparator for comparing said first pattern signal with said image signal to output said first pulse-width-modulated signal and a second comparator for comparing said second pattern signal with said image signal to output said second pulse-width-modulated signal.

12. An image processing apparatus according to claim 11, wherein said first and second pattern signals are triangular waves which have different respective periods.

13. An image processing apparatus comprising:
image signal generation means for generating an image signal;
first process means for processing an image signal generated by said image signal generation means by employing a first pattern signal having a first period and for outputting a first pulse-width-modulated signal;
second process means for processing an image signal generated by said image signal generation means by employing a second pattern signal having a second period different from the first period and for outputting a second pulse-width-modulated signal;

selection means for selecting one of the first and second pulse-width-modulated signals to be output from said first and second process means; and inhibit means for inhibiting generation of a pattern signal associated with a pulse-width-modulated signal not selected, in association with said selection means.

14. An image processing apparatus according to claim 13, wherein said first and second process means include first and second clock signal generation means for generating first and second clock signals of different periods to form said first and second pattern signals, respectively, and first and second pattern signal generation circuit for generating said first and second pattern signals in response to said first and second clock signals, respectively, and wherein said selection means selects one of said first and second pattern signals in accordance with a designation signal, and said inhibit means inhibits the generation of one of said first and second clock signals in accordance with said designation signal.

15. An image processing apparatus according to claim 13, wherein said first and second pattern signals are triangular waves which have different respective periods.

16. An image processing apparatus according to claim 13, wherein each of said first and second process means includes a first comparator for comparing said first pattern signal with said image signal to output said first pulse-width-modulated signal and a second comparator for comparing said second pattern signal with said image signal to output said second pulse-width-modulated signal.

* * * * *

UNITED STATES PATENT AND TRADEMARK OFFICE
CERTIFICATE OF CORRECTION

PATENT NO. : 4,999,718

DATED : March 12, 1991

INVENTOR(S) : HITOSHI ARAI

It is certified that error appears in the above-identified patent and that said Letters Patent is hereby corrected as shown below:

COLUMN 1

Line 60, "provid" should read --provide--.

COLUMN 2

Line 6, "with;" should read --with--.
　　Line 18, "illustrates" should read --illustrate--.
　　Line 23, "wave," should read --wave.--.

COLUMN 4

Line 48, "signal" should read --signals--.

COLUMN 5

Line 9, "2" should read --2,--.
　　Line 34, "4," should read --10,--.
　　Line 45, "5" should read --5,--.

Signed and Sealed this

Twenty-second Day of February, 1994

Attest:

BRUCE LEHMAN

Attesting Officer　　Commissioner of Patents and Trademarks